Figure 1:
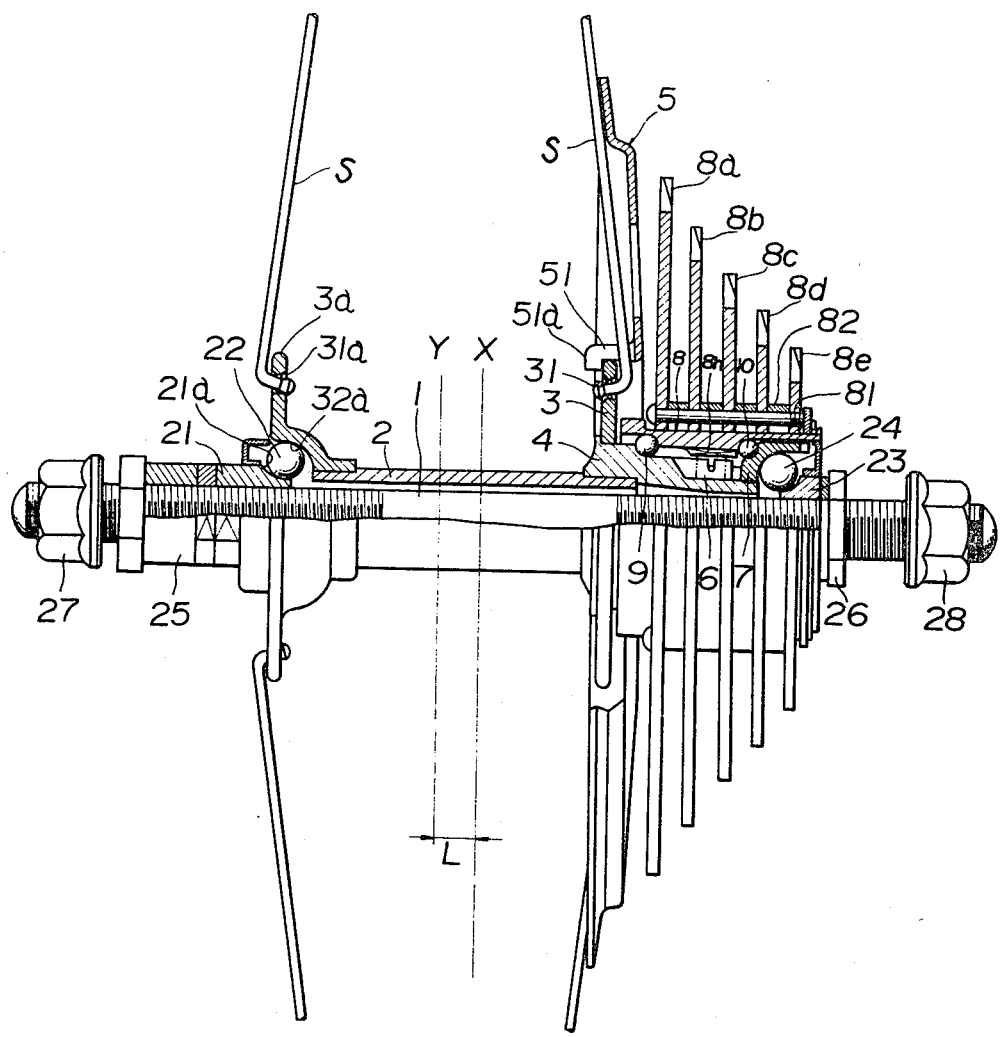

United States Patent [19]

Nagano

[11] 4,278,265
[45] Jul. 14, 1981

[54] REAR HUB FOR A BICYCLE HAVING IMPROVED SPOKE PROTECTOR MOUNTING

[75] Inventor: Masashi Nagano, Sakai, Japan

[73] Assignee: Shimano Industrial Company Limited, Osaka, Japan

[21] Appl. No.: 26,694

[22] Filed: Apr. 3, 1979

[30] Foreign Application Priority Data

Apr. 14, 1978 [JP] Japan .............................. 53/49837[U]

[51] Int. Cl.³ .......................... B60R 19/00; B62J 13/00
[52] U.S. Cl. .................................. 280/160.1; 280/238; 280/289 G; 301/37 SA; 474/160
[58] Field of Search ........... 280/200, 236, 238, 289 D, 280/289 G, 289 R, 160.1; 301/6 V, 37 SA, 37 R; 74/217 B

[56] References Cited

U.S. PATENT DOCUMENTS

| | | | |
|---|---|---|---|
| 1,878,528 | 9/1932 | Kraeft | 301/37 SA |
| 4,023,424 | 5/1977 | Ryan et al. | 280/238 |

FOREIGN PATENT DOCUMENTS

| | | |
|---|---|---|
| 504866 | of 0000 | Belgium . |
| 350724 | 3/1922 | Fed. Rep. of Germany . |
| 7033184 | 1/1971 | Fed. Rep. of Germany . |
| 2352706 | 12/1977 | France . |
| 1411457 | of 0000 | France . |
| 23171082 | of 0000 | France . |
| 2404558 | of 0000 | France . |

*Primary Examiner*—John J. Love
*Assistant Examiner*—Donn McGiehan
*Attorney, Agent, or Firm*—Stevens, Davis, Miller & Mosher

[57] ABSTRACT

A rear hub for a bicycle comprises a hub shell having a first and a second hub flange, a bearing cone extending from the first hub flange axially outwardly thereof, a driving member having a sprocket and being supported to the bearing cone through a unidirectional transmission mechanism, and a spoke protector having retainers engageable with the first hub flange for mounting the protector to the first hub flange.

3 Claims, 4 Drawing Figures

REAR HUB FOR A BICYCLE HAVING IMPROVED SPOKE PROTECTOR MOUNTING

This invention relates to a rear hub for a bicycle, and more particularly to a rear hub having hub shell provided with a pair of hub flanges carrying spokes and incorporating a driving member carrying a sprocket.

Generally, this kind of rear hub comprises a hub shaft fixed to the bicycle frame, a hub shell having first and second hub flanges and being rotatably supported to the hub shaft, and a freewheel mounted at one axial end of the hub shell axially outwardly of the first hub flange. The freewheel comprises a bearing cone extending from one axial end of the hub shell axially outwardly of the first hub flange, a driving member including a sprocket supported rotatably to the bearing cone, and a unidirectional rotary-transmission mechanism inserted between the driving member and the bearing cone for transmitting the driving force from the driving member to the bearing cone.

In this rear hub construction, the driving force caused by pedalling is transmitted to the driving member by way of a driving chain in mesh with the sprocket at the driving member and then to the hub shell therefrom through the unidirectional transmission. If the chain happens to come off the sprocket in mesh therewith it contacts with and damages spokes mounted to the hub flange. The chain often comes off a sprocket especially when the multi-stage freewheel having a plurality of sprockets is used to switch the chain to a selective one of the sprockets. Therefore, a spoke protector has conventionally been used to prevent damage to the spokes.

The spoke protector is conventionally fit onto a mounting device of a given axial length and fixed thereto by a snap ring, the mounting device being formed of an extension of the driving member extending at one axial end toward the hub flange. Therefore, the hub flange at the sprocket mounting side should be widely spaced from the sprocket. As a result, the hub flange at the sprocket mounting side shifts axially toward the center of an interval between rear fork ends carrying the hub, whereby the perpendicular to the axial center between both the hub flanges is not coincident with that to the axial center of the wheel carried by the hub though the spokes, which undesirably increases the so-called offset amount. Furthermore, since the spoke protector is in free rotation together with the driving member while in relative rotation to the hub shell, a gap is required between the spokes and the peripheral edge of the same. The gap widens the interval between the hub flange and the sprocket to thereby further increase the offset amount. Besides this, when the spoke protector mounted to the driving member contacts with the chain when switched, it partially axially deflects and hits the spokes. Thus, the spoke protector may hurt the spokes instead of protecting them. Furthermore, a particular tool is necessary for handling the snap ring, whereby it is not easy to mount and remove the spoke protector to and from the driving member.

A zero offset amount may be attained by shifting the second hub flange (at the opposite side) toward the axial center of hub by an extent equal to the shift of first hub flange (at the sprocket mounting side). However, the interval between both the hub flanges should be as large as possible to enable the hub to stabilize the bicycle wheel. When this interval is too small, it causes instability of the wheel as well as less durability in the spokes. As a result, the technique of shifting the second hub flange to compensate for the offset amount is not used in practice.

An increased offset amount also leads to differences in the length of the spokes carried by the first hub flange relative to those carried by the second hub flange. Furthermore, the inclination angles of the spokes at both hub flanges largely change so that the smaller length and inclination angle spokes are subjected to an unbalanced load resulting in less durability of the spokes when applied with excessive force.

The invention has been designed to overcome the problems associated with the conventional spoke protector. An object of the invention is to provide a rear hub for a bicycle, which is capable of minimizing an increase in the offset amount caused by a spoke protector, preventing the spokes from being damaged by the spoke protector, and facilitating mounting and removal of the spoke protector.

The inventor has observed that the hub shell has a first and second hub flange which are smaller in diameter than the sprocket and that the spoke protector is larger in diameter than the sprocket, and has designed a spoke protector and mounting arrangement which uses the first hub flange at a side of the sprocket for mounting the spoke protector.

In other words, the invention is directed to a retaining means provided at the spoke protector, the retaining means being engageable with the first hub flange to thereby mount the protector thereto.

Accordingly, the spoke protector retained to the first hub flange needs no mounting device for mounting the protector to the driving member so that the driving member has a smaller axial length to that extent, whereby the first hub flange is located more axially outwardly of the hub shell. Consequently, the first hub flange is spaced from the second one at a fully larger interval to thereby minimize the aforesaid offset amount.

Conveniently, the spoke protector, which is mounted to the first hub flange, rotates always together with the spokes carried therewith with no rotation relative to the hub shell as in conventional spoke protector mounting, so that the spoke protector may contact with the spokes, eliminating a useless gap. Hence, the offset amount is further minimized to ensure that the spokes are prevented from being damaged by the spoke protector when in contact therewith.

Furthermore, the plurality of retainers, which serve as the retaining means for attaching the spoke protector to the first hub flange, are merely hooked to the outer periphery or decorative bores, when provided, of the first hub shell, thereby facilitating the mounting of protector without the need of any particular tool.

The spoke protector is formed in a dish-like shape and made elastically deformable at the central portion thereof with respect to the outer periphery, so that when retained to the first hub flange the spoke protector may elastically bend at the central portion, thereby pressing the protector at its outer periphery onto the spokes. Hence, the protector is reliably mountable and the interval between the spokes and the protector is made small to decrease the offset amount.

Figure 2:
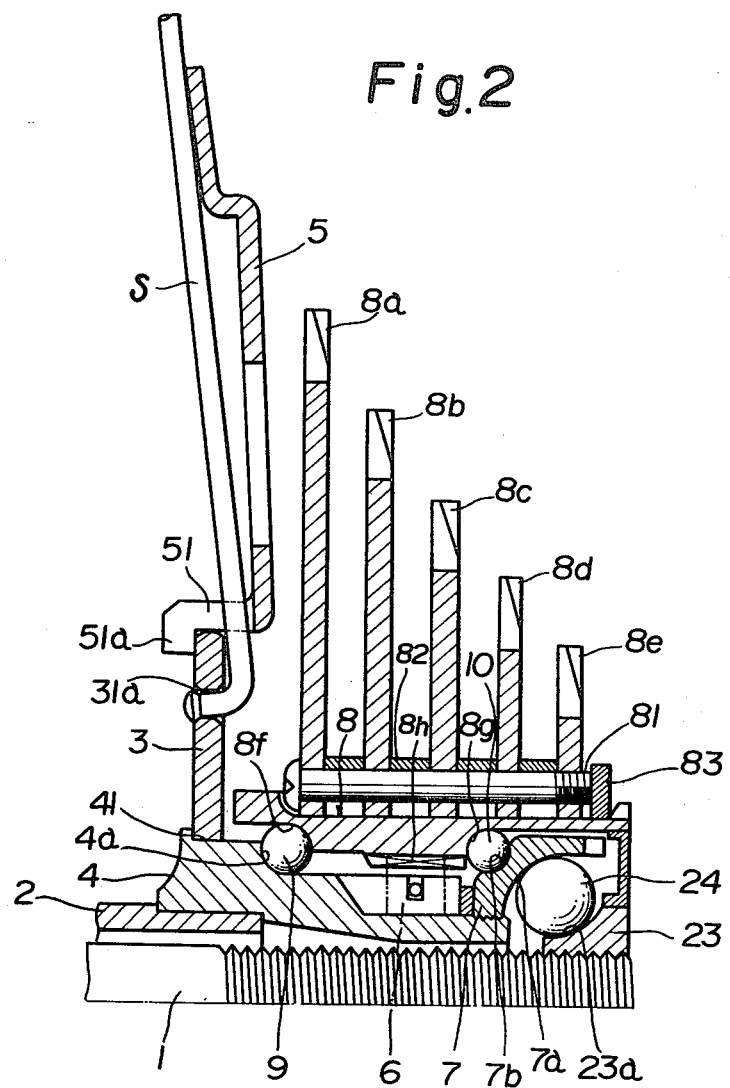
Figure 3:
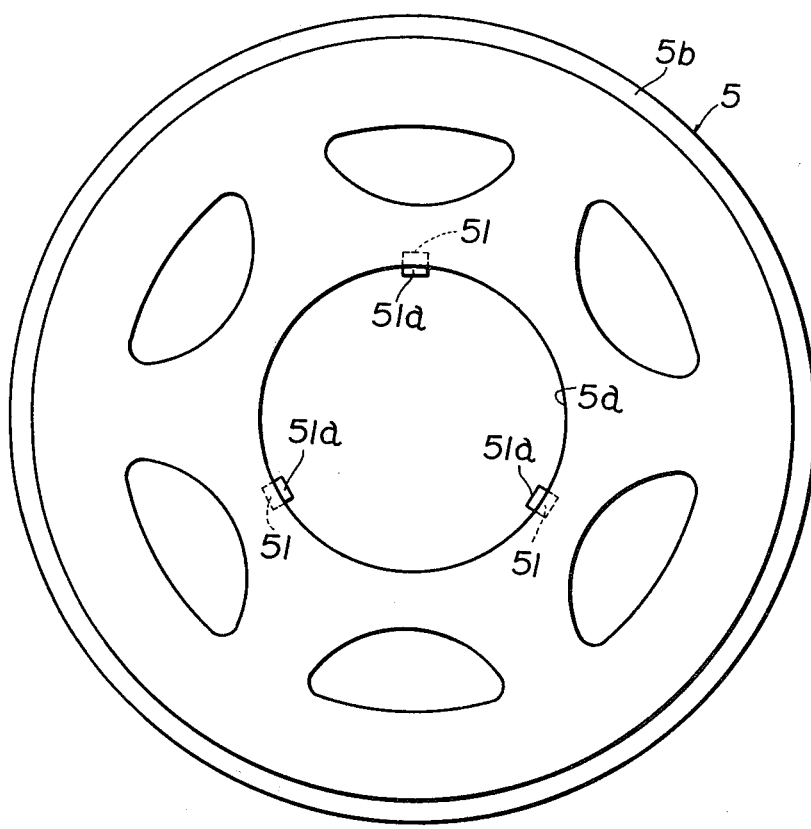
Figure 4:
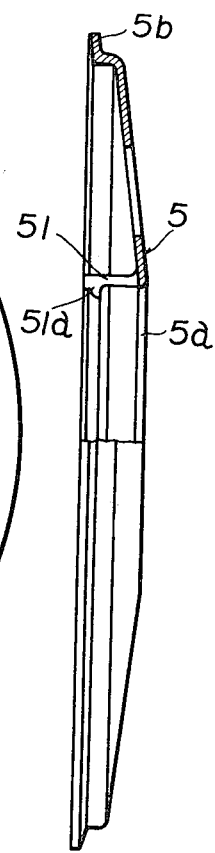

These and other objects and novel features of the invention will be more apparent from the following description taken in conjunction with the accompanying drawings, in which FIG. 1 is a partially cutaway front view of an embodiment of the invention, FIG. 2 is an enlarged sectional view of a principal portion thereof only, FIG. 3 is a front view of a spoke protector, and FIG. 4 is a partially cutaway side view thereof.

Referring to the drawings, reference numeral 1 designates a hub shaft fixed to the bicycle frame (not shown) and 2 designates a hub shell rotatably supported to the hub shaft 1. At respective axial sides of the hub shell 2 are provided a first and second hub flanges 3 and 3a.

The first hub flange 3 is fixed to a bearing cone 4 through connecting means, such as a spline connection, the bearing cone 4 being fixed to one axial end of the hub shell 2 which is formed as a tubular member. In addition, the first hub flange 3 may be formed integrally with the hub shell 2 or bearing cone 4, or fixed to one axial end of the hub shell 2 by means of a press fit or other fixing means in the same manner as the second hub flange.

At the outer periphery of bearing cone 4 are provided a ball race 4a and pawls 6 in mesh with ratchet teeth at a driving member to be hereinafter described, and a screw thread positioned axially outwardly of the pawls 6, the screw thread being screwed with a bearing member 7 having at the outer and inner surfaces thereof ball races 7a and 7b. The ball race 4a at the bearing cone 4 and that 7b at the bearing member 7 carry the driving member 8 rotatably through balls 9 and 10 respectively.

The driving member 8 is tubular and is provided at a substantially intermediate portion of the inner periphery thereof with ratchet teeth 8h in mesh with the pawls 6 and at both axial sides of the ratchet teeth 8h with ball races 8f and 8g opposite to the ball races 4a and 7b respectively, and carries at its periphery sprockets 8a through 8e.

Five sprockets forming a five-stage freewheel are shown, but a single sprocket may be used. The five-stage freewheel may, like a monostage freewheel, be composed of sprockets which are integrated with the driving member 8, or may be composed of sprockets which are fit onto the driving member 8 through collars.

Besides this, each of the sprockets 8a through 8e may, as shown in FIG. 2, be connected by a bolt 81 to form a block, which is detachably mounted to the driving member 8.

In detail, the sprockets 8a through 8d have each a through hole in the vicinity of the inner periphery, and that 8e has a threaded hole at the same place. The sprockets 8a through 8e are separated by collars 82 and connected integrally with each other through the bolt 81 which penetrates through each sprocket and screws with the threaded hole. Thus, the sprockets in a block are inserted onto the driving member 8 from one axial end thereof and fixed thereto by a snap ring 83.

The ratchet teeth 8h and pawls 6 constitute a unidirectional rotary transmission mechanism for transmitting the driving force from the driving member 8 to the bearing cone 4, through which mechanism the driving member 8 is freely rotatable in one direction with respect to the bearing cone 4.

Referring to FIG. 1, between a ball race 32a at the second hub flange 3a and a ball race 21a at a ball holder 21 screwed with one axial end of the hub shaft 1 are inserted balls 22, and between the ball race 7a at the bearing member 7 and a ball race 23a at a ball holder 23 screwed with the other axial end of hub shaft 1 are inserted balls 24, whereby the hub shell 2 is rotatably supported at both axial ends thereof through the balls 22 and 24.

The rear hub construction so far described is well-known. This invention is directed to utilizing the first hub flange 3 at the rear hub constructed as described to mount a spoke protector 5.

The spoke protector is dish-like shaped, preferably round-dish-like shaped, and larger in diameter than the low speed sprocket 8a which has the largest diameter of the sprockets. The spoke protector 5 is formed mainly of synthetic resin, so that the central portion of the same may be elastically deformed with respect to the outer periphery.

The spoke protector 5 is also provided at its central portion with a bore 5a of a diameter approximately equal to an outer diameter of the first hub flange 3, at its outer periphery with a flat flange 5b, and in the vicinity of its center bore 5a with a plurality of retainers 51 having retaining portions 51a. The retainers 51 are integrated with the spoke protector 5 and constitute retaining means through which the protector 5 is mounted to the first hub flange 3.

In other words, the retainers 51 extend from the peripheral edge of central bore 5a at the protector 5 toward the first hub flange 3 to form extensions having at the tips thereof hooked retaining portion 51a which are engageable with the inner surface at the outer periphery of first hub flange 3, the retaining portion 51a being slightly movable when the extensions bend elastically.

The spoke protector 5 is mounted to the first hub flange 3 in such a manner that the protector 5 is inserted between the first hub flange 3 and the largest diameter sprocket 8a prior to assembly of spokes S with the first hub flange 3 and then is mounted after the assembly of spokes, or inserted from axially outward end of the driving member 8 after the sprockets 8a to 8e are removed therefrom and the spokes are assembled. In this instance, the protector 5 is placed outwardly of the spokes S and pushed at the central portion toward the first hub flange 3 so that the retainers 51 are elastically bent to hook the outer periphery of first hub flange 3, thereby engaging the retaining portions 51a with the inner surface at the peripheral portion of the first hub flange 3.

At this time, the central portion of spoke protector 5, when an applied push action is stopped, tends to restore, but the restoration is restrained in a given range by the retaining portions retained to the first hub flange 3. As a result, the elastic restoring force at the central portion acts on the retaining portions 51a and a flange 5b at the outer periphery of spoke protector 5, whereby the flange 5b leads to elastical contact with the spokes S. Hence, the spoke protector 5 is reliably fixed to the first hub flange 3, and the offset amount L of the perpendicular Y to the axial center between both the hub flanges 3 and 3a with respect to the perpendicular X to the axial center of bicycle wheel (not shown) is reduced.

As seen from the above description, the spoke protector 5 is only pushed at the central portion thereof to be mounted to the first hub flange 3, which requires no particular tool, thereby being mounted readily, efficiently and in a shot time.

As an alternative arrangement to being mounted to the peripheral edge of hub flange 3, the spoke protector 5 may be inserted through insertable retainers into decorative bores when provided at a radially intermediate portion of hub flange 3.

To complete the description of the drawings, reference numerals 25 and 26 designate lock nuts for the ball holders 21 and 23, and 27 and 28 designate nuts for fixing the hub shaft 1 to the bicycle frame (not shown).

As clearly understood from the aforesaid description, the rear hub of the invention has the spoke protector mounted to the first hub flange, thereby minimizng any increase in offset amount caused by use of a spoke protector. Hence, the rear wheel is supported in stable condition and the spokes have an improved durability.

Also, since the spoke protector rotates together with the hub shell, it cannot damage the spokes.

Furthermore, the spoke protector can be assembled without resort to a particular tool as shown, thereby facilitating mounting and removal of the spoke protector.

While a preferred embodiment of the invention has been described using specific terms, such description is for illustrative purpose only, and it is to be understood that changes and variations may be made without departing from the spirit or scope of the invention which is defined by the following claims.

What is claimed is:

1. A rear hub for a bicycle, comprising:
   a hub shaft;
   a hub shell having first and second hub flanges at respective ends thereof rotatably supported to said hub shaft;
   a bearing cone extending from one axial end of said hub shell axially outwardly of said first hub flange;
   a driving member having at least one sprocket rotatably supported to said bearing cone, a sprocket of said driving member being located adjacent said fist hub flange;
   a unidirectional rotary transmission mechanism inserted between said bearing cone and said driving member for transmitting the driving force from said driving member to said bearing cone; and
   a disc-shaped spoke protector larger in outer diameter than said sprocket mounted to and adjacent said first hub flange, such that the outer surface of said spoke protector opposes the teeth of said sprocket located adjacent said hub flange; said spoke protector having a central disc portion which is elastically deformable relative to an outer peripheral disc portion thereof, said central portion defining a center bore and having a plurality of retainers attached to and emanating from said central portion at a location adjacent said center bore, said plurality of retainers extending toward said first hub flange and having hook-shaped retaining portions which elastically deform to lockingly engage with said first hub flange when pressure is applied to said central portion axially of said protector toward said first hub flange, said spoke protector contacting at a position radially outward from said center bore with spokes carried by said first hub flange and being elastically deformed at said central portion relative to the outer portion when said retaining portions are lockingly engaged with said first hub flange whereby said spoke protector is fixed to said first hub flange and retained against said spokes.

2. A rear hub for a bicycle as set forth in claim 1, wherein said spoke protector is made from synthetic resin and said retainers are integrated with said spoke protector.

3. A spoke protector for a bicycle hub having first and second hub flanges supporting spokes to a rim comprising:
   a disc-shaped spoke protector having a central disc portion which is elastically deformable relative to an outer peripheral disc portion thereof, said central disc portion defining a center bore and having a plurality of retainers extending in an axial direction of said protector and having hook-shaped retaining portions elastically deformable upon contact with a first hub flange of said hub and then lockingly engageable with said first hub flange when said central portion is pushed axially of said protector toward and into contact with said first hub flange, said spoke protector being contactable at a position radially outward from said center bore with spokes carried by said first hub flange and being elastically deformed at said central disc portion relative to said outer peripheral disc portion upon locking engagement of said retaining portions with said first hub flange.

* * * * *